United States Patent [19]

Abe et al.

[11] Patent Number: 4,549,628

[45] Date of Patent: * Oct. 29, 1985

[54] POWER STEERING DEVICE

[75] Inventors: Michio Abe, Kasugai; Naoyuki Maeda, Inuyama; Shigemitsu Tokunaga, Kasugai, all of Japan

[73] Assignee: Tokai TRW & Co., Ltd., Kasugai, Japan

[*] Notice: The portion of the term of this patent subsequent to Jul. 3, 2001 has been disclaimed.

[21] Appl. No.: 481,145

[22] Filed: Mar. 28, 1983

[30] Foreign Application Priority Data

Apr. 14, 1982 [JP] Japan ................................ 57-61104

[51] Int. Cl.$^4$ .............................................. B62D 5/06
[52] U.S. Cl. .................................... 180/143; 180/141; 192/104 C
[58] Field of Search ............... 180/143, 142, 141, 132, 180/79.1, 79.3; 192/58 A, 104 C, 104 A, 104 F

[56] References Cited

U.S. PATENT DOCUMENTS 3,368,656  2/1968  Hilpert ........................ 192/104 F X
3,522,795  8/1970  Seifert ........................ 192/58 A X
4,457,390  7/1984  Abe et al. ........................ 180/142

Primary Examiner—Joseph F. Peters, Jr.
Assistant Examiner—Mitchell J. Hill
Attorney, Agent, or Firm—William E. Jackson

[57] ABSTRACT

A power steering device of an automotive vehicle, comprises an engine of the vehicle, a steering pump driven by the engine, an actuator, a control valve connected to both the steering pump and the actuator for controlling the amount and direction of power fluid supplied from the steering pump into the actuator in response to the steering operation of the steering wheel, a centrifugal clutch having an input shaft and an output shaft for receiving the power from the engine at the input shaft and transmitting the power to the steering pump from the output shaft when the vehicle speed is low or zero, and spring means for causing the centrifugal clutch to cut off the power transmission from the input shaft to the output shaft when the vehicle speed is so high that the centrifugal force of the centrifugal clutch is larger than the biasing force of the spring means.

10 Claims, 5 Drawing Figures

POWER STEERING DEVICE

BACKGROUND OF THE INVENTION

This invention relates to a power steering device for an automotive vehicle.

In general, a power steering device is used to increase the supply of power fluid which assists the operation of a steering wheel at a low speed so that the steering wheel can rotate lightly. When a vehicle is running at a high speed, the power fluid is reduced to cause the steering wheel to rotate heavily so that the steering wheel can be stabilized.

Various types of power steering devices have been proposed. A prior art power steering device is to control the power fluid which is supplied from a steering pump to a power cylinder by means of an electromagnetic by-pass valve. Another type conventional power steering device is to control the power fluid by means of a fluid control valve in response to running or driving conditions of the vehicle.

However, in the conventional devices, within a high speed range, a majority of power fluid intermittently supplied by the steering pump in proportion to the engine speed is continuously discharged into an oil tank so that the power fluid is not effectively used, and energy saving cannot be attained.

Most conventional steering pumps for automotive vehicles are of an engine-driven type in which the speed of the steering pump is substantially the same as the engine speed. However, it is preferable that the supply of the power fluid is increased when a car is running at a low speed or stops. At an intermediate or high speed, the supply of the power fluid should be fully reduced or stopped, and the manual steering is preferable from the viewpoint of the steering stabilization.

For the purpose of energy saving, it has been proposed that the engine speed is reduced during idling and that the uppermost speed range of the engine is set very high so as to reduce the engine size and weight. In such a conventional engine-driven type steering pump, the steering assist power is insufficient at zero-speed steering, garaging or the like.

DETAILED DESCRIPTION OF PREFERRED EMBODIMENTS

Figure 1:
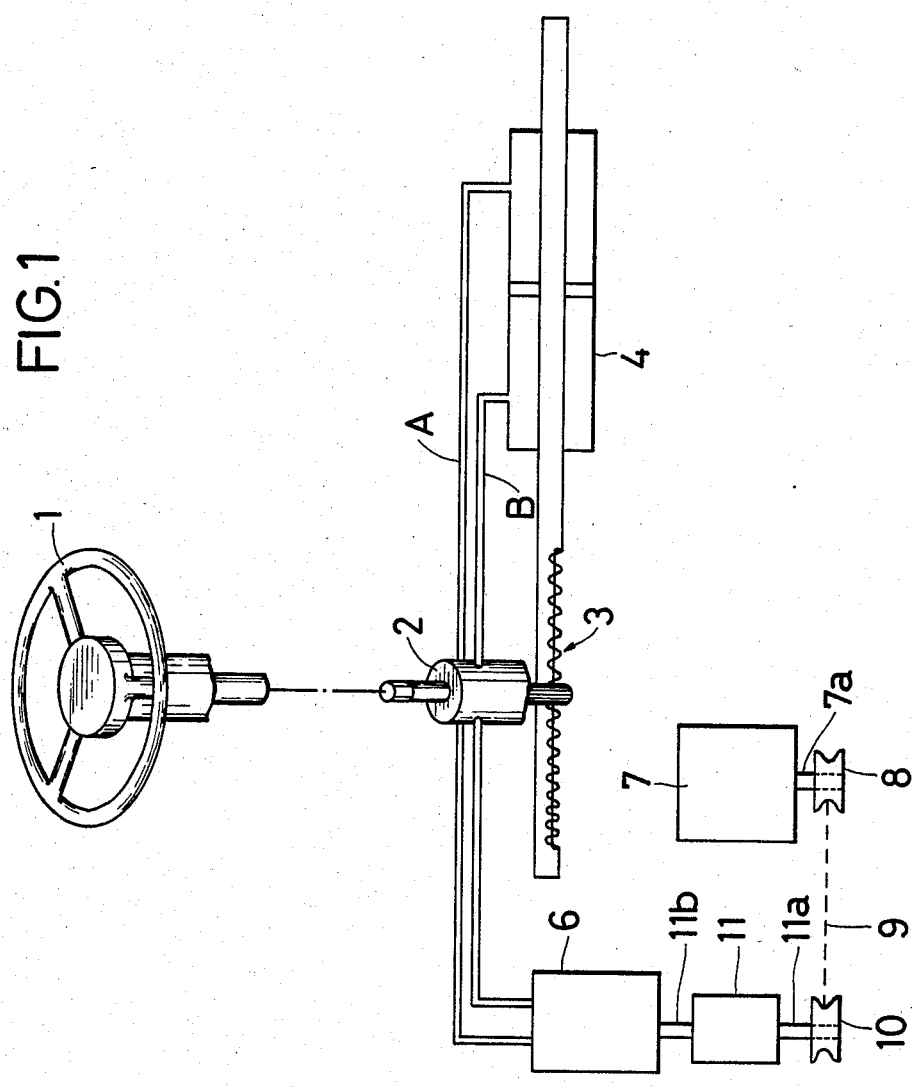
FIG. 1 is a diagrammatic view showing a power steering device for an automotive vehicle according to this invention.

A steering wheel 1 is connected by way of a control valve 2 and a steering gear 3 to an actuator or power cylinder 4. The actuator 4 is connected by way of oil lines A, B to a steering pump 6. The control valve 2 is placed at an intermediate portion of the oil lines A, B.

The control valve 2 is to control the amount and directions of the power fluid supplied from the steering pump 6 into the actuator 4 in response to the steering operation of the steering wheel 1.

Although not shown, a by-pass valve may be additionally placed between the control valve 2 and the actuator 4 so that the power fluid can be supplied by by-passing the control valve 2 if desired.

A driving shaft 7a of an engine 7 is connected to an input shaft 11a of a centrifugal clutch 11 by means of a pulley-belt assembly consisting of an engine-side pulley 8, belt 9 and pump-side pulley 10. An output shaft 11b of the centrifugal clutch 11 is connected to the steering pump 6.

Figure 2:
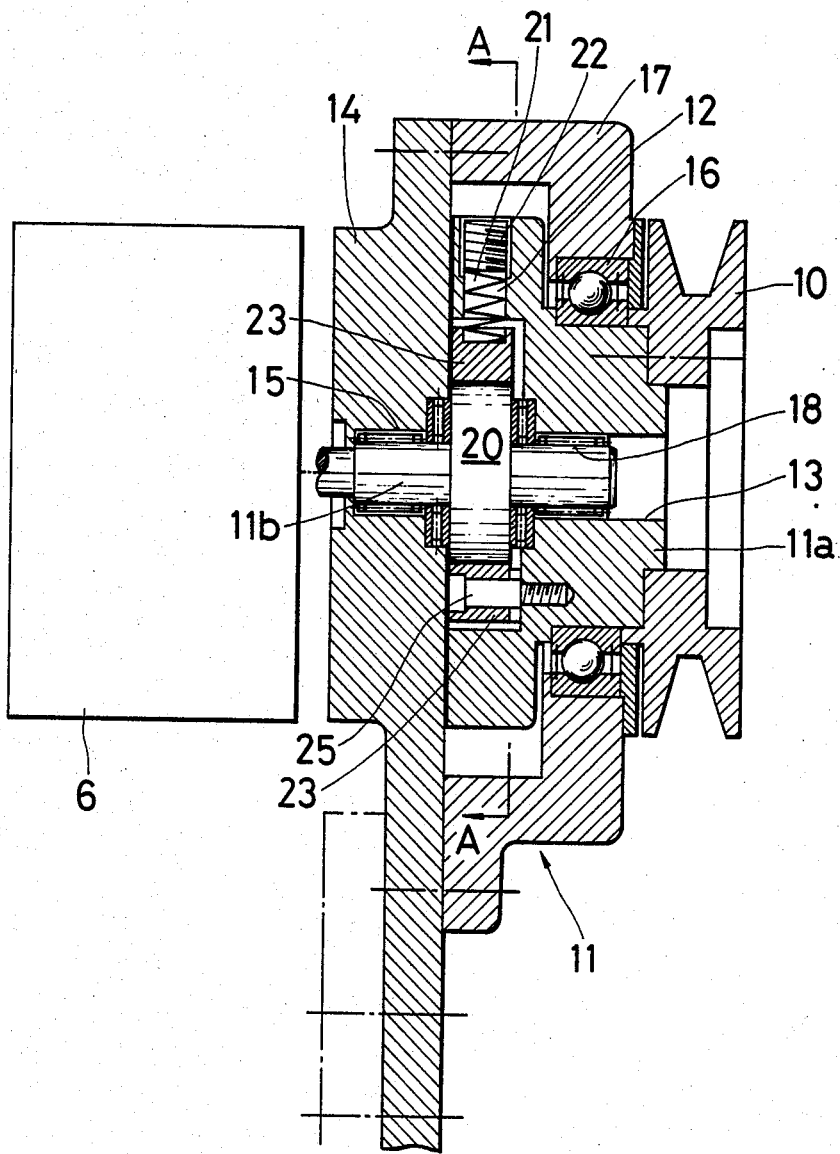
FIG. 2 is a vertical sectional view showing a centrifugal clutch used in a power steering device for an automotive vehicle according to this invention.
Figure 3:
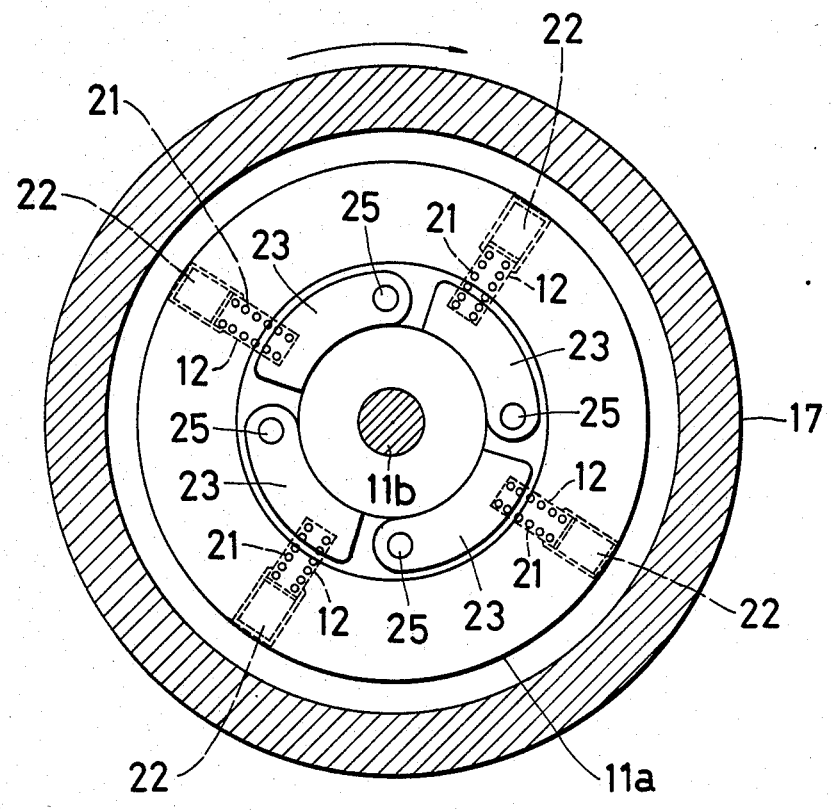
FIG. 3 is a sectional view taken along the line A—A in FIG. 2.

FIGS. 2 and 3 show one example of the centrifugal clutch 11. The pulley 10 is fixed at one end of the input shaft 11a of the centrifugal clutch 11.

As above-stated, the pulley 10 is connected to the engine 7. The other end of the input shaft 11a has a large diameter portion in which four holes 12 are formed in the radius directions at the same intervals.

A through-hole 13 in a step shape is formed coaxially in the central portion of the input shaft 11a along the axis of the input shaft 11a. The output shaft 11b is arranged coaxially in the through-hole 13.

The output shaft 11b is rotatably supported by a bracket 14 by means of a bearing 15. The input shaft 11a of the centrifugal clutch 11 is rotatably supported by a support member 17 by way of a bearing 16 at an outside portion of the input shaft 11a. The right hand portion of the output shaft 11b of the centrifugal clutch 11 is rotatably placed in the input shaft 11a by way of a bearing 18.

The large diameter portion 20 of the output shaft 11b is placed in a position facing the holes 12 of the input shaft 11a.

As shown in FIG. 3, the four holes 12 are formed to receive springs 21, respectively. The outer end of each spring 21 is supported by a support member 22. The outer portion of the support member 22 has a male thread portion with which a female thread portion of the holes 12 of the input shaft 11a are screwed. The biasing force of each spring 21 can be easily adjusted by moving the support members 22.

The inner end of each spring 21 abuts against a tip portion of each press member 23. The base portion of each press member 23 is rotatable around a pin 25 within the large diameter portion of the input shaft 11a. The four press members 23 are movable within a limited ring-like space between the input shaft 11a and the output shaft 11b.

Each of the four press members 23 has an inside surface corresponding in shape to the large diameter portion 20 of the input shaft 11b so that sufficient friction between the press member 23 and the large diameter portion 20 of the output shaft 11b can be obtained due to the biasing force of the spring members 21. In other words, when the press members 23 are forcibly pressed against the large diameter portion 20 of the output shaft 11b by the biasing force of the spring members 21, the power from the input shaft 11a is surely transmitted to the output shaft 11b.

The operation of the centrifugal clutch 11 shown in FIGS. 2 and 3 will be explained.

Upon receipt of the power from the engine 7, the pulley 10 rotates so that the input shaft 11a rotates clockwise, that is, in the direction of the arrow in FIG. 3.

When a car is running at a low speed, the speed of the input shaft 11a is low. Therefore, the centrifugal force of the centrifugal clutch 11 is small so that the biasing force of the spring members 21 is larger than the centrifugal force of the clutch 11. As a result, because the press members 23 are pressed against the large diameter portion 20 of the output shaft 11b as shown in FIG. 3, the power can be properly transmitted. When the speed of the input shaft 11a comes to a predetermined level, the centrifugal force of the centrifugal clutch 11 becomes equivalent to the biasing force of the spring members 21. Then the friction between the press members 23 and the large diameter portion 20 of the output shaft 11b is reduced whereby a slipping phenomenon occurs. The power cannot be sufficiently transmitted and then cut off. As a result, the steering pump 6 stops.

Figure 4:
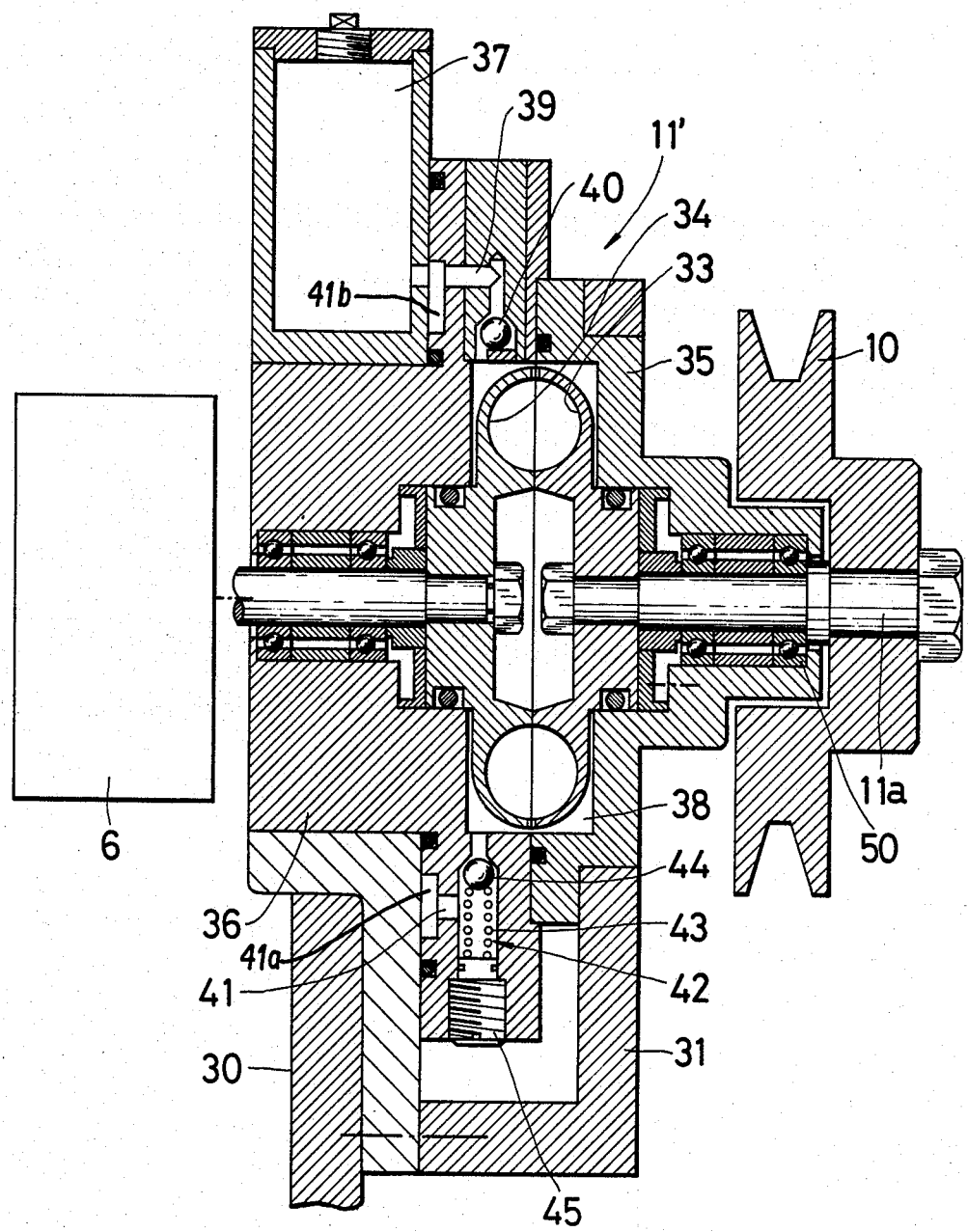
FIG. 4 is a vertical sectional view showing another centrifugal clutch used in a power steering device according to this invention.

FIG. 4 shows another embodiment of the centrifugal clutch 11' used in a power steering device according to this invention.

The support member 31 is fixed to a bracket 30. The centrifugal clutch 11' is supported by the support member 31.

In this embodiment of the invention, the centrifugal clutch 11' is formed of a fluid-clutch type.

The input shaft 11a and the output shaft 11b have at their inner end the respective impellers 33, 34. The input shaft 11a is joined to the pulley 10. The output shaft 11b is joined to the steering pump 6. The input shaft 11a is rotatably supported by an input-side clutch casing 35 by way of a bearing. The output shaft 11b is rotatably supported by an output-side clutch casing 36 by way of a bearing 50. An oil tank 37 is attached to the output-side clutch casing 36. The power fluid is filled in the oil tank 37 although not shown.

A chamber 38 of the centrifugal clutch 11', in which the impellers 33, 34 are arranged, is communicated by way of an oil path 39 to the oil tank 37. A ball type one-way valve 40 is placed in an intermediate portion of the oil path 39. The chamber 38 is also communicated by way of oil lines 41, 41a, 41b to the oil tank 37 as partly shown in FIG. 4. Another ball type one-way valve 42 is placed in an intermediate portion of the oil line 41. The ball 44 is biased upwardly by a spring member 43 at the upper end thereof. The lower end of the spring member 43 is supported by a support member 45. The support member 45 is screwed with a lower female thread of the output-side clutch casing 36. By turning the support member 45 in a given direction, the biasing force of the spring member 43 against the ball 44 can be adjusted.

The operation of the centrifugal clutch 11' shown in FIG. 4 will be explained.

In response to the driving of the engine 7, the pulley 10 rotates, and the input shaft 11a simultaneously rotates. At a low speed or zero-speed, the power fluid flows from the oil tank 37 by way of the oil line 39 into the chamber 38 so that the power fluid is filled in the chamber 38. The power fluid is not shown for the purpose of clarity. As well-known, the rotation power of the input shaft 11a is transmitted by way of the impellers 33, 34 to the output shaft 11b whereby the steering pump 6 is actuated.

When the impellers 33, 34 rotate, the centrifugal force thereof affects the power fluid or oil within the chamber 38. For instance, when the rotation speed of the input shaft 11a comes to a predetermined value, the centrifugal force of the centrifugal clutch 11' becomes larger than the biasing force of the spring member 43.

As a result, the ball 40 is upwardly moved to thereby close the upper oil path 39 while the ball 44 is moved downwardly against the biasing force of the spring member 43 to thereby open the lower oil line 41. Thus, the power fluid within the chamber 38 is discharged by way of the oil line 41 into the oil tank 37. Accordingly, the power transmission from the input shaft 11a to the output shaft 11b is cut off.

If the rotation speed of the input shaft 11a decreases, the power fluid again flows into the chamber 38 through the oil line 39 from the oil tank 37.

Figure 5:
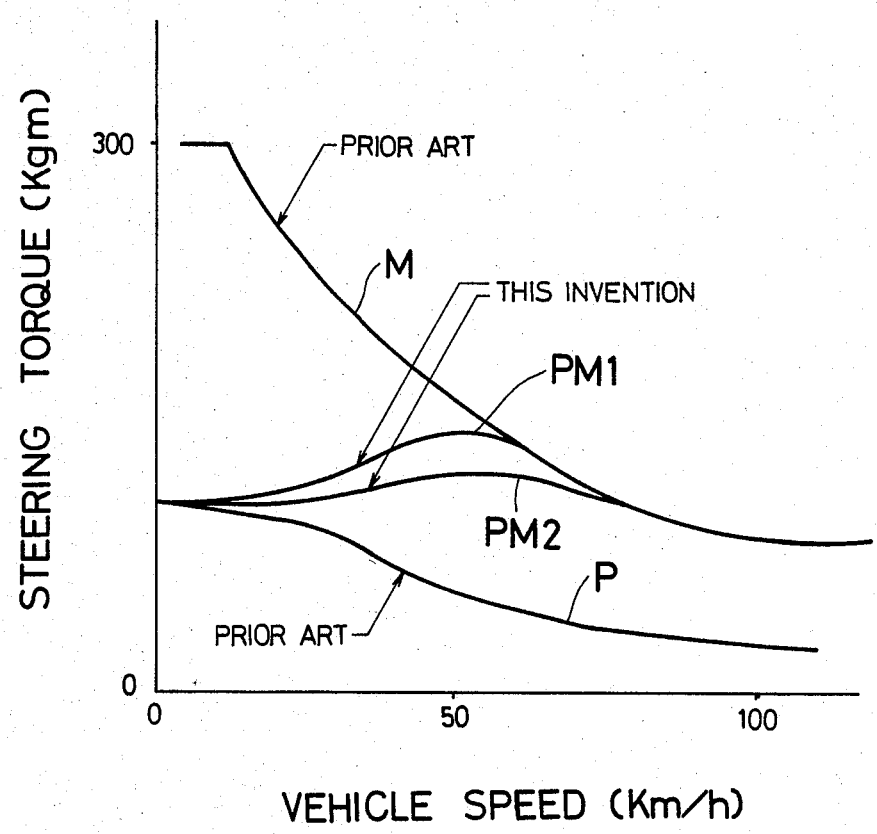
FIG. 5 is a graph showing a relationship between the vehicle speed and steering torque.

FIG. 5 shows a relationships between the steering torque and vehicle speed by comparing this invention with two conventional devices. The curve M shows an example of conventional perfect manual steering. The curve P shows a conventional complete electrical controlled power steering. The curves PM1 and PM2 show steering effects according to this invention.

According to this invention, power steering is used within a zero speed and low speed range. Manual steering is used within a high speed range.

The curve PM1 shows a relationship between the vehicle speed and the steering torque when the centrifugal clutch 11 of FIGS. 2 and 3 is used. The curve PM2 shows the relationship between the vehicle speed and the steering torque when the centrifugal clutch 11' of FIG. 4 is used.

Such curves PM1 and PM2 within a power steering range can be changed by adjusting the biasing force of the spring members 21, 43.

According to one aspect of this invention, the speed of the steering pump at a very low speed or during idling can be set at least three times as the engine speed so that the steering pump 6 can most effectively work. Also, at an intermediate or high speed, the power transmission from the engine 7 to the steering pump 6 can be cut off by using the centrifugal clutch 11 or 11' whereby the steering pump 6 stops.

During idling or at a low speed, the upper-most power of the steering pump within the highest speed range can be sufficiently obtained for the purpose of the power assist of the steering gear 3 whereby the steering can be operated very lightly. At an intermediate or high speed, because the power assist is not necessary, the steering pump 6 stops. By so doing, the consumed energy of the steering pump 6 can be minimized.

As can be seen from the foregoing, according to this invention, these and other advantages can be obtained.

Although the preferred embodiments of this invention have been disclosed and described, it is clear that other embodiments and modifications of this invention are possible. For example, the term "centrifugal clutch" is used herein in a comprehensive sense, i.e., to broadly refer to any clutch in which the centrifugal force is directly or indirectly used to cut off the power transmission from an engine to a steering pump and is not limited to only the shown and described mechanism. This invention may be practiced in still other ways without departing from the spirit or essential character thereof.

What is claimed is:

1. A power steering device of an automotive vehicle, comprising:
   an engine of the vehicle;
   a steering pump driven by the engine;
   an actuator;
   a control valve connected to both the steering pump and the actuator for controlling the amount and direction of power fluid supplied from the steering pump into the actuator in response to the steering operation of the steering wheel;

a centrifugal clutch having an input shaft and an output shaft for receiving the power from the engine at the input shaft and transmitting the power to the steering pump from the output shaft when the vehicle speed is low or zero; and spring means for causing the centrifugal clutch to cut off the power transmission from the input shaft to the output shaft when the vehicle speed is so high that the centrifugal force of the centrifugal clutch is larger than the biasing force of the spring means.

2. A power steering device as claimed in claim 1, wherein the input shaft has a large diameter portion in which a plurality of holes are formed to face inwardly; the spring means being arranged in each of the holes; an outer end of the spring means being supported by support members; an inner end of the spring means biasing each tip portion of the press members inwardly so that the press members can forcibly engage a large diameter portion of the output shaft due to the biasing force thereof to produce friction between the press members and the output shaft.

3. A power steering device as claimed in claim 2, wherein the press members are movable within a limited space between the input shaft and the output shaft.

4. A power steering device as claimed in claim 2, wherein the support members are screwed with the input shaft such that the biasing force of the spring means can be adjusted.

5. A power steering device as claimed in claim 1, wherein the centrifugal clutch is formed of a fluid-clutch type.

6. A power steering device as claimed in claim 1, wherein the input and output shafts have impellers, respectively, at their inner ends within a chamber formed in the centrifugal clutch in such a manner that the power can be transmitted from the input shaft to the output shaft.

7. A power steering device as defined in claim 6, further comprising: an oil tank; an oil line for connecting the chamber with the oil tank; and a ball which is biased by the spring means in such a direction to close the oil line at a low or zero vehicle speed and moves to open the oil line against the biasing force of the spring means at a high vehicle speed.

8. A power steering device as claimed in claim 7, wherein the spring means is supported by a support member screwed with a casing of the centrifugal clutch so that the biasing force of the spring means can be adjusted.

9. A power steering device, for an automotive vehicle, comprising:

a steering wheel for the vehicle;

a steering pump;

an actuator; a control valve for controlling the amount of power fluid supplied from the steering pump into the actuator in response to the steering operation of the steering wheel;

an engine for the vehicle;

a centrifugal clutch placed in position between the steering pump and the engine for cutting off the power transmission from the engine to the steering pump, the centrifugal clutch increasing its centrifugal force as the engine speed increases; and spring means which is actuated by the centrifugal force of the centrifugal clutch so as to cause the centrifugal clutch to cut off the power transmission from the engine to the steering pump when the engine speed increases to such a predetermined level that the centrifugal force of the centrifugal clutch becomes larger than the biasing force of the spring means.

10. A power steering device as defined in claim 9, in which a driving shaft of the engine is connected to an input shaft of the centrifugal clutch by way of a belt and pulley assembly.

* * * * *